United States Patent [19]
McCabe

[11] 3,804,437
[45] Apr. 16, 1974

[54] VEHICLE HITCH

[76] Inventor: James B. McCabe, 1900 Deo Dara Dr., Birmingham, Ala. 35226

[22] Filed: Aug. 1, 1972

[21] Appl. No.: 276,961

[52] U.S. Cl............................ 280/489, 280/406 A
[51] Int. Cl.............................................. B60d 1/06
[58] Field of Search........................ 280/406 A, 489

[56]        References Cited
         UNITED STATES PATENTS
2,872,214   2/1959   Hume .................................. 280/489
2,982,565   5/1961   Lance ............................. 280/406 A
2,709,604   5/1955   Hartman ........................ 280/406 A Primary Examiner—Leo Friaglia
Attorney, Agent, or Firm—Jennings, Carter & Thompson

[57]              ABSTRACT

A first upwardly extending bearing member is carried by a first support member connected to a towing vehicle and a second upwardly extending bearing member is carried by a second support member connected to a towed vehicle with an upper portion of the second bearing member to restrain downward movement thereof. Resilient means urges the second bearing member toward the first bearing member to absorb downward forces.

2 Claims, 5 Drawing Figures

PATENTED APR 16 1974 3,804,437
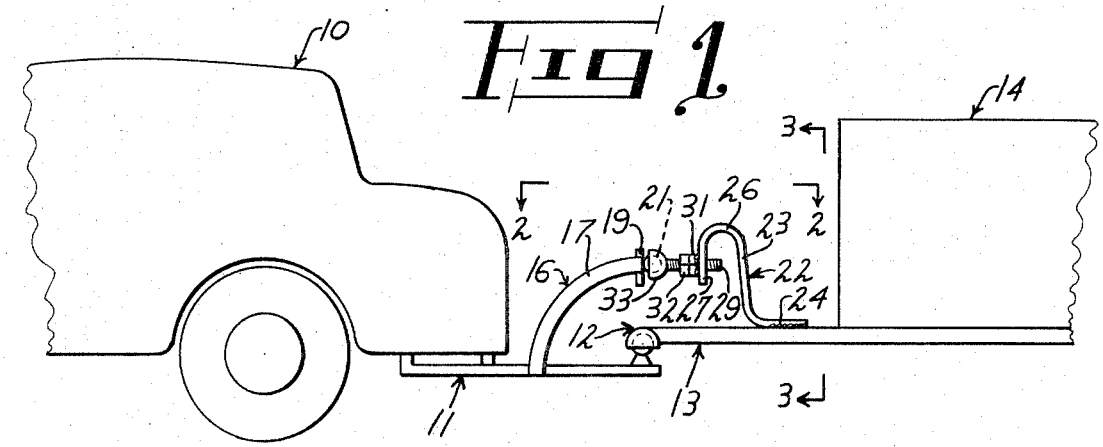
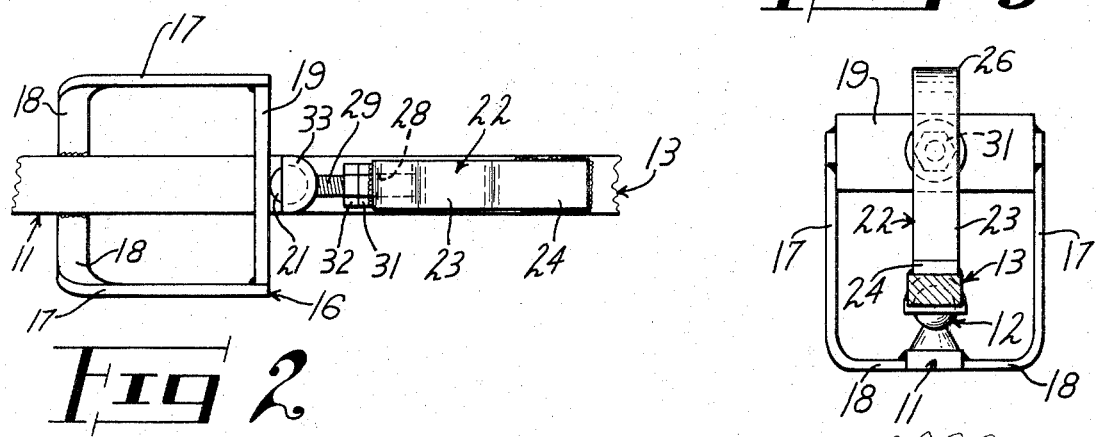
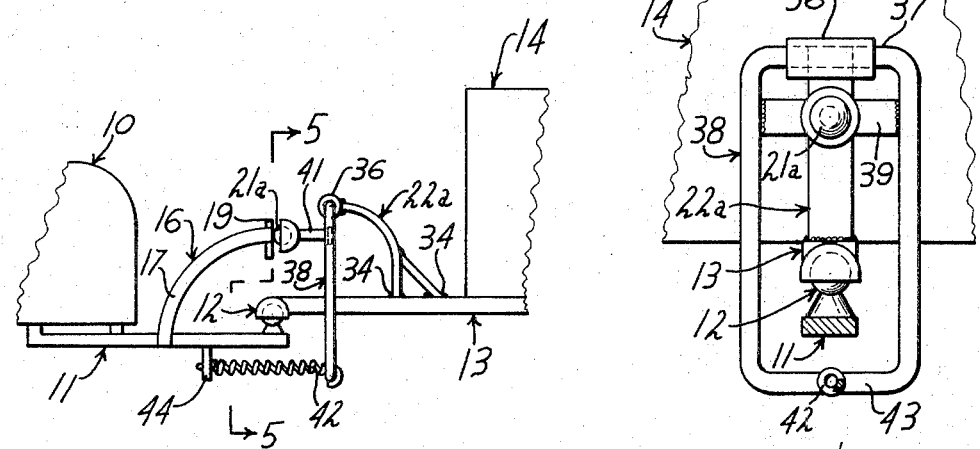

VEHICLE HITCH

This invention relates to a vehicle hitch and more particularly to a hitch for connecting a towing vehicle to a towed vehicle, such as a trailer, whereby downward movement of the pivotal connection therebetween is limited.

Heretofore in the art to which my invention relates, difficulties have been encountered in the construction of trailer hitches due to the fact that conventional type hitches permit the pivot connection between the towing vehicle and the towed vehicle to dip greatly when excessive downward forces are applied to the pivotal connection for the hitch. Such downward movement of the pivotal connection applies pressure to the frame of the towing vehicle, thus causing upward movement of the forward end of the towing vehicle whereby it is elevated relative to the rear of the towing vehicle. This elevated position of the forward end of the towing vehicle not only reduces the braking action of the front wheels of the towing vehicle but also causes the headlights to be inclined upwardly to produce a dangerous glare to approaching drivers. Also, the elevation of the front end of the towing vehicle impairs the steering of the vehicle whereby the driver does not maintain complete control of the vehicle at all times.

BRIEF SUMMARY OF THE INVENTION

In accordance with my present invention, I provide a vehicle hitch having an upwardly and rearwardly extending bearing member carried by a first support member connected to the towing vehicle and an upwardly and forwardly extending bearing member carried by a second support member connected to a towed vehicle with an upper portion of the upwardly and forwardly extending bearing member engaging an upper portion of the upwardly and rearwardly extending bearing member to restrain downward movement thereof. Resilient means urges the upwardly and forwardly extending bearing member toward the upwardly and rearwardly extending bearing member whereby excessive downward forces are absorbed.

Apparatus embodying features of my invention is illustrated in the accompanying drawing, forming a part of this application, in which:

FIG. 1 is a side elevational view, partly broken away, showing my improved hitch connecting a towing vehicle to a towed vehicle;

FIG. 2 is an enlarged top plan view of the apparatus shown in FIG. 1 taken generally along the line 2—2 of FIG. 1;

FIG. 3 is a sectional view taken generally along the line 3—3 of FIG. 1;

FIG. 4 is a side elevational view corresponding to FIG. 1, but showing a modified form of my invention; and, FIG. 5 is an enlarged, sectional view taken generally along the line 5—5 of FIG. 4.

Referring now to the drawing for a better understanding of my invention, I show a towing vehicle 10 having a trailer hitch support 11 connected by a conventional type ball and socket connection 12 to a second hitch support 13 which is carried by a towed vehicle 14, such as a trailer. In view of the fact that the trailer hitch supports 11 and 13 and the ball and socket connection 12 are conventional units heretofore employed to connect a towing vehicle to a towed vehicle, no further description thereof is deemed necessary.

To restrain downward movement of the pivotal connection 12, I mount a first bearing member 16 on the hitch support 11. The bearing member 16 comprises a pair of upwardly and rearwardly extending arms 17 which are connected at their lower ends to inturned members 18 which in turn are secured to the hitch member 11, by welding, as shown in FIGS. 2 and 3. Accordingly, the arms 17 extend upwardly and rearwardly and terminate above the pivotal connection 12. The upper, rearmost ends of the arms 17 are connected by an upstanding, transverse plate-like member 19 having a rearwardly facing bearing surface, as shown.

Mounted in position to engage the rear surface of the transverse plate-like member 19 is a ball-like member 21 carried by a bearing member 22 which extends upwardly and forwardly from the hitch frame 13. The bearing member 22 comprises an upstanding leaf-like spring member 23 having a laterally extending lower end portion 24 which is secured to the hitch support 13, as shown. The upper end of the spring member 23 is bent over as at 26 and terminates in a downturned portion 27. The downturned portion 27 is provided with a threaded opening 28 therethrough for receiving a threaded member 29. Preferably, a nut 31 is welded to the forward side of the downturned portion 27 to add strength thereto. The threaded member 29 selectively is secured in place by a lock nut 32 to selectively vary the force exerted by the spring member 23. The forward end of threaded member 29 carries a semispherical bearing member 33 which carries the ball-like member 21, as shown.

As shown in FIG. 1, the ball-like member 21 carried by the upwardly and forwarding extending bearing member 22 is positioned above the pivotal connection 12 between the hitch frames 11 and 13. The leaf-like spring 23 absorbs excessive downward forces applied to the ball and socket connection 12 between the hitch frames 11 and 12, since it urges the ball-like member 21 toward the bearing member 16. While I have shown the spring 23 as being a leaf-like spring, it will be apparent that other spring means could be employed, such as a compression spring interposed between the upwardly and forwardly extending bearing member 22 and the hitch frame 13.

In FIGS. 4 and 5 of the drawing, I show a slightly modified form of my invention. The apparatus is the same as the apparatus shown in FIGS. 1 through 3 with the exception of the construction of the upwardly and forwardly extending bearing member 22. That is, instead of the bearing member 22, I employ an upwardly and forward extending bearing member 22a which is rigidly secured to the hitch frame 13 by welding at 34. The upper forward portion of the bearing member 22a carries a sleeve-like bearing member 36 which receives an upper transverse member 37 carried by a depending rectangular member 38. An intermediate transverse member 39 is carried by the rectangular member 38, as shown. Secured to and projecting forwardly from the transverse member 39 is a bracket 41 which carries a ball-like member 21a which is adapted to engage the rear face of the transverse plate-like member 19 carried by the bearing member 16, as described hereinabove. The depending member 38, forming a part of bearing member 22a, and its ball-like member 21a are urged forwardly toward the bearing member 16 by a tension spring 42 which is interposed between a lower transverse member 43 for the depending member 38 and a spring support bracket 44 carried by the hitch frame 11.

From the foregoing description, the operation of my improved vehicle hitch will be readily understood. The hitch frames 11 and 13 are pivotally connected to each other by the ball and socket connection 12 in the usual manner. The ball-like member 21 or 21a, as the case may be, is positioned adjacent the rearwardly facing surface of the plate-like member 19 carried by the bearing member 16. The spring members 23 or 42, as the case may be, apply the proper tension to force the bearing member 22 or 22a, as the case may be, toward the bearing member 16 to thus absorb excessive downward forces.

From the foregoing, it will be seen that I have devised an improved trailer hitch. By providing bearing members which engage each other above the ball and socket connection for the hitch frames, downward movement of the ball and socket connection is limited, thereby restraining downward movement of the rear end of the towing vehicle. Accordingly, the forward end of the towing vehicle is not elevated excessively due to downward movement of the pivotal connection between the towing vehicle and the towed vehicle. Also, by providing resilient means for urging the bearing members toward each other excessive downward forces are absorbed, thus providing smooth operation of the hitch. Furthermore, by providing the rearwardly facing surface on the transverse plate-like member 19 carried by the bearing member 16, together with the ball-like member at the forward end of the upwardly and forwardly extending bearing member, the hitch mechanism is adapted for free universal movement whereby the towed vehicle, such as a trailer, is adapted for free movement relative to the towing vehicle. This is a very desirable feature of my invention due to the fact that it is often necessary for the towing vehicle and towed vehicle to twist relative to each other as the vehicles pass over irregular surfaces.

While I have shown my invention in but two forms, it will be obvious to those skilled in the art that it is not so limited, but is susceptible of various other changes and modifications without departing from the spirit thereof.

What I claim is:

1. In a hitch having a first support adapted for connection to a towing vehicle and a second support adapted for connection to a towed vehicle with a pivotal connection between said first support and said second support, the improvement comprising:
   a. a first bearing member carried by said first support and extending upwardly therefrom, and
   b. a second bearing member carried by a leaf-like spring member secured at its lower end to said second support and extending upwardly therefrom with an upper portion of said second bearing member engaging an upper portion of said first bearing member and restraining downward movement of said first bearing member and said pivotal connection with said leaf-like spring member urging said second bearing member toward said first bearing member to absorb excessive downward forces.

2. A hitch as defined in claim 1 in which adjustable means is provided between said leaf-like spring member and said first bearing member to vary the force exerted by said leaf-like spring member.

* * * * *